(12) United States Patent
Watanabe et al.

(10) Patent No.: US 9,018,118 B2
(45) Date of Patent: Apr. 28, 2015

(54) DIELECTRIC THIN FILM-FORMING COMPOSITION, METHOD OF FORMING DIELECTRIC THIN FILM AND DIELECTRIC THIN FILM FORMED BY THE METHOD

(71) Applicants: Mitsubishi Materials Corporation, Tokyo (JP); STMicroelectronics(Tours) SAS, Tours (FR)

(72) Inventors: Toshiaki Watanabe, Naka (JP); Hideaki Sakurai, Naka (JP); Nobuyuki Soyama, Sanda (JP); Guillaume Guegan, Tours (FR)

(73) Assignees: Mitsubishi Materials Corporation, Tokyo (JP); STMicroelectronics(Tours) SAS, Tours (FR)

( * ) Notice: Subject to any disclaimer, the term of this patent is extended or adjusted under 35 U.S.C. 154(b) by 66 days.

(21) Appl. No.: 13/716,544

(22) Filed: Dec. 17, 2012

(65) Prior Publication Data

US 2013/0155571 A1      Jun. 20, 2013

(30) Foreign Application Priority Data

Dec. 20, 2011   (EP) .................................. 11306708

(51) Int. Cl.
| | |
|---|---|
| C04B 35/00 | (2006.01) |
| C09D 5/00 | (2006.01) |
| H01B 3/10 | (2006.01) |
| H01G 4/33 | (2006.01) |

(52) U.S. Cl.
CPC .. C09D 5/00 (2013.01); H01B 3/10 (2013.01); H01G 4/33 (2013.01)

(58) Field of Classification Search
CPC ......................... C04B 35/4682; C04B 35/465; C04B 35/495; H01G 4/1227
USPC .................... 501/135, 136, 137, 138; 428/210
See application file for complete search history.

(56) References Cited

U.S. PATENT DOCUMENTS

| | | | | |
|---|---|---|---|---|
| 5,630,872 | A * | 5/1997 | Ogi et al. | 106/287.18 |
| 2004/0066250 | A1 * | 4/2004 | Hunt et al. | 333/24 R |
| 2006/0287188 | A1 | 12/2006 | Borland et al. | |
| 2009/0297804 | A1 * | 12/2009 | Paul et al. | 428/210 |

FOREIGN PATENT DOCUMENTS

| | | |
|---|---|---|
| JP | 60-236404 A | 11/1985 |
| JP | 02-197108 A | 8/1990 |

(Continued)

OTHER PUBLICATIONS

European Search Report dated May 25, 2012, issued for the European Patent Application No. 11306708.6.

*Primary Examiner* — Noah Wiese
(74) *Attorney, Agent, or Firm* — Locke Lord LLP; James E. Armstrong, IV

(57) ABSTRACT

A liquid composition is provided for forming a thin film in the form of a mixed composite metal oxide in which a composite oxide B containing copper (Cu) and a composite oxide C containing manganese (Mn) are mixed into a composite metal oxide A represented with the general formula: $Ba_{1-x}Sr_xTi_yO_3$, wherein the molar ratio B/A of the composite oxide B to the composite metal oxide A is within the range of $0.002<B/A<0.05$, and the molar ratio C/A of the composite oxide C to the composite metal oxide A is within the range of $0.002<C/A<0.03$.

19 Claims, 1 Drawing Sheet

(56) References Cited

FOREIGN PATENT DOCUMENTS

| | | |
|---|---|---|
| JP | 11-260667 A | 9/1999 |
| JP | 2007-042692 A | 2/2007 |
| JP | 2008-053563 A | 3/2008 |
| JP | 4420232 B2 | 2/2010 |

\* cited by examiner

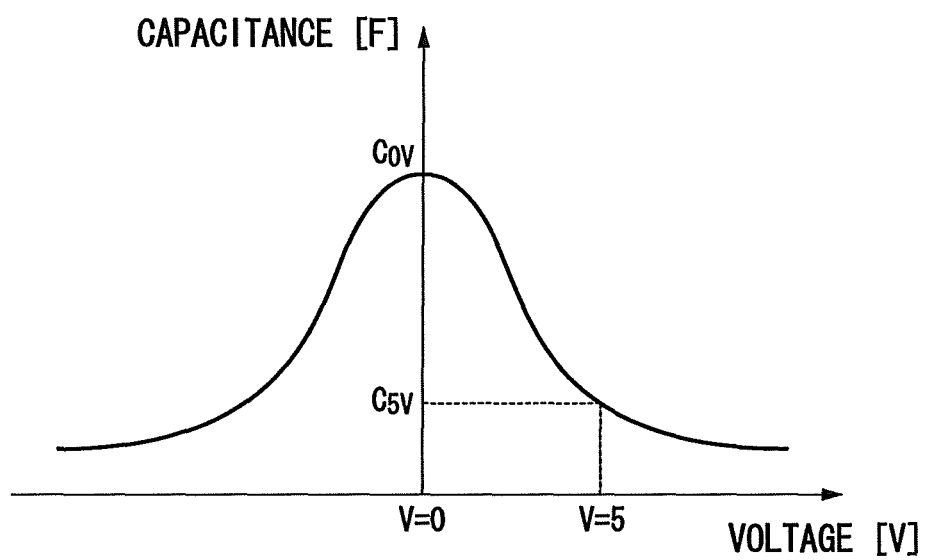

DIELECTRIC THIN FILM-FORMING COMPOSITION, METHOD OF FORMING DIELECTRIC THIN FILM AND DIELECTRIC THIN FILM FORMED BY THE METHOD

BACKGROUND OF THE INVENTION

1. Field of the Invention

The present invention relates to a dielectric thin film-forming composition that is capable of reducing dielectric loss of a dielectric thin film while demonstrating high tunability in a thin film capacitor and the like and maintaining excellent leak current characteristics, a method of forming a dielectric thin film, and a dielectric thin film formed by the method. In the present description, "tunable" refers to the ability to change electrostatic capacitance in response to a change in applied voltage, while "tunability" refers to the variability or rate of change of electrostatic capacitance.

2. Description of Related Art

Thin film capacitors, which are composed of an upper electrode, a lower electrode and a dielectric layer formed between both electrodes, are incorporated as variable capacitance elements (tunable elements) in high-frequency tunable devices such as high-frequency filters, high-frequency antennas and phase shifters. Thin film capacitors function as capacitors that cause a change in electrostatic capacitance in response to a change in voltage applied between both electrodes. A dielectric thin film formed using a perovskite-type oxide such as strontium titanate ($SrTiO_3$), barium strontium titanate (BST) or barium titanate ($BaTiO_3$) having a high dielectric constant is used in the dielectric layer that composes these thin film capacitors. Examples of methods used to form dielectric thin films include physical vapor phase growth methods such as vacuum deposition, sputtering or laser ablation, chemical vapor phase growth methods such as chemical vapor deposition (CVD) and chemical solution deposition (CSD) methods such as a sol-gel method or metalorganic decomposition (MOD) (see, for example, Japanese Unexamined Patent Application, First Publication No. S60-236404 and Japanese Unexamined Patent Application, First Publication No. H11-260667). In these methods, a precursor solution is prepared consisting mainly of metal alkoxide or metal carboxylate and the like, and the prepared precursor solution is deposited on a substrate by dip coating or spin coating and the like, following by going through a drying step by heat treatment and a step for decomposing and removing organic components to obtain a thin film by crystallizing to a target substance.

Thin film capacitors incorporated in high-frequency tunable devices are required to have electrostatic capacitance variability (tunability) with respect to an applied voltage, and it is preferable that the range over which electrostatic capacitance can be controlled when a voltage is applied be as large as possible, or in other words, that the thin film capacitor have high tunability. The reason for this is that as tunability becomes higher, wider resonance frequency bands can be handled with a smaller change in voltage. More specifically, if electrostatic capacitance prior to the application of voltage is defined as $C_{0V}$ and electrostatic capacitance after applying a voltage of t V is defined as $C_{tV}$, then tunability can be represented by $(C_{0V}-C_{tV})/C_{0V}\times100\%$. For example, as shown in FIG. 1, when a voltage of 5 V is applied, although electrostatic capacitance changes from $C_{0V}$ when voltage is not applied to $C_{5V}$, at this time, the larger the decrease in electrostatic capacitance from $C_{0V}$ to $C_{5V}$, the higher the tunability, and the thin film capacitor can be said to have high tunability.

A tunable capacitor has been disclosed as a technology for enhancing this tunability that is capable of ensuring high tunability using a material having a high dielectric constant while maintaining desired impedance when using in a high-frequency band (see, for example, Japanese Unexamined Patent Application, First Publication No. 2008-53563).

In addition, a thin film capacitor and the like incorporated in such a high-frequency tunable device is required to not only have high tunability, but also have basic characteristics such as low leak current density and high dielectric constant. The addition of elemental Mn to a dielectric thin film composing a dielectric layer of a thin film capacitor and the like is disclosed as being an effective method for reducing leak current density (see, for example, Japanese Unexamined Patent Application, First Publication No. H2-197108 and Japanese Patent (Granted) Publication No. 4420232). In the technology disclosed in Japanese Patent (Granted) Publication No. 4420232, in addition to adding elemental Mn to a raw material liquid that forms a dielectric thin film, by baking the raw material liquid coated onto a substrate in an inert gas atmosphere containing oxygen, capacitance density can be improved simultaneous to reducing leak current density.

SUMMARY OF THE INVENTION

Problems to be Solved by the Invention

However, one of the problems of the related art as described above is that, in the technology disclosed in the aforementioned Japanese Unexamined Patent Application, First Publication No. 2008-53563, for example, a complex step must be carried out when forming the dielectric layer consisting of forming a second dielectric layer having a dielectric constant lower than a first dielectric layer so as to cover a portion of the main surface of the first dielectric layer in order to demonstrate high tunability. In addition, in the technology indicated in Japanese Unexamined Patent Application, First Publication No. H2-197108 and Japanese Patent (Granted) Publication No. 4420232, although an attempt is made to reduce leak current density and improve capacitance density, it is difficult to simultaneously realize high tunability.

Moreover, the dielectric layer that composes a thin film capacitor and the like is desired to be a dielectric that has low dielectric loss. This is because dielectric loss causes a rise in temperature since a portion of the energy of the electric field is changed to heat, thereby destroying insulation and causing mechanical damage. In addition, if dielectric loss is excessively large, the circuit loss when incorporating the dielectric in an element becomes large, thereby making this undesirable. For reasons such as these, a dielectric thin film incorporated as a dielectric layer is required to have a low level of dielectric loss.

Therefore, from the viewpoint of improving the material, the inventors of the present invention realized the present invention that is capable of demonstrating high tunability in a thin film capacitor and the like without having to go through complex steps, as well as reducing dielectric loss of a dielectric thin film while maintaining excellent leak current characteristics.

An object of the present invention is to provide a dielectric thin film-forming composition, which has low dielectric loss and enhances leak current characteristics and high tunability in a thin film capacitor and the like, a method of forming a dielectric thin film, and a dielectric thin film

Means for Solving the Problems

A first aspect of the present invention is a dielectric thin film-forming composition for forming a BST dielectric thin film, comprising: a liquid composition for forming a thin film in the form of a mixed composite metal oxide in which a composite oxide B containing copper (Cu) and a composite oxide C containing manganese (Mn) are mixed into a composite metal oxide A represented with the general formula: $Ba_{1-x}Sr_xTi_yO_3$ (wherein, $0.2<x<0.6$ and $0.9<y<1.1$); wherein, the liquid composition is composed of an organic metal compound solution in which the raw material for composing the composite metal oxide A, the raw material for composing the composite oxide B and the raw material for composing the composite oxide C are dissolved in an organic solvent at a ratio so as to yield the metal atomic ratio indicated in the aforementioned general formula, and so that the molar ratio B/A of the composite oxide B to the composite metal oxide A is within the range of $0.002<B/A<0.05$, and the molar ratio C/A of the composite oxide C to the composite metal oxide A is within the range of $0.002<C/A<0.03$.

A second aspect of the present invention is the invention based on the first aspect, wherein the raw material for composing the composite metal oxide A is a compound in which an organic group is bonded to a metal element through an oxygen atom or nitrogen atom thereof.

A third aspect of the present invention is the invention based on the second aspect, wherein the raw material for composing the composite metal oxide A is at least one compound selected from the group consisting of a metal alkoxide, metal-diol complex, metal-triol complex, metal carboxylate, metal-β-diketonate complex, metal-β-diketoester complex, metal-β-iminoketo complex and a metal-amino complex.

A fourth aspect of the present invention is the invention based on the first aspect, wherein the raw material for composing the composite oxide B is a compound in which an organic group is bonded to elemental copper (Cu) through an oxygen atom or nitrogen atom thereof.

A fifth aspect of the present invention is the invention based on the fourth aspect, wherein the raw material for composing the composite oxide B is at least one compound selected from the group consisting of a carboxylate compound, nitrate compound, alkoxide compound, diol compound, triol compound, β-diketonate compound, β-diketoester compound, β-iminoketo compound and amino compound.

A sixth aspect of the present invention is the invention based on the fifth aspect, wherein the carboxylate compound is copper naphthenate, copper n-octanoate, copper 2-ethylhexanoate, copper n-heptanoate, copper n-hexanoate, copper 2-ethylbutyrate, copper n-valerate, copper i-valerate, copper n-butyrate, copper i-butyrate or copper propionate.

A seventh aspect of the present invention is the invention based on the fifth aspect, wherein the nitrate compound is copper nitrate.

An eighth aspect of the present invention is the invention based on the first aspect, wherein the raw material for composing the composite oxide C is a compound in which an organic group is bonded to elemental manganese (Mn) through an oxygen atom or nitrogen atom thereof.

A ninth aspect of the present invention is the invention based on the eighth aspect, wherein the raw material for composing the composite oxide C is at least one compound selected from the group consisting of a carboxylate compound, nitrate compound, alkoxide compound, diol compound, triol compound, β-diketonate compound, β-diketoester compound, β-iminoketo compound and amino compound.

A tenth aspect of the present invention is the invention based on the first to ninth aspects, further containing at least one stabilizers, selected from the group consisting of a β-diketone, β-ketonic acid, β-ketoester, oxy acid, diol, triol, higher carboxylic acid, alkanolamine and polyvalent amine, at a ratio of 0.2 to 3 moles to 1 mole of the total amount of metal in the composition.

An eleventh aspect of the present invention is the invention based on the first to tenth aspects, wherein the molar ratio B/A of the composite oxide B to the composite metal oxide A is $0.003 \leq B/A \leq 0.03$.

A twelfth aspect of the present invention is the invention based on the first to eleventh aspects, wherein the molar ratio C/A of the composite oxide C to the composite metal oxide A is $0.003 \leq C/A \leq 0.02$.

A thirteenth aspect of the present invention is a method of forming a dielectric thin film, comprising: repeating a step for coating and drying the dielectric thin film-forming composition based on the first to twelfth aspects on a heat-resistant substrate until a film of a desired thickness is obtained, followed by baking the film at a temperature equal to or higher than the crystallization temperature in air, in an oxidizing atmosphere or in a water vapor-containing atmosphere.

A fourteenth aspect of the present invention is a dielectric thin film containing Cu and Mn formed by the method based on the thirteenth aspect.

A fifteenth aspect of the present invention is the invention based on the fourteenth aspect, wherein a thin film capacitor is formed having a dielectric thin film having a film thickness within the range of 100 to 500 nm as a dielectric layer, and this thin film capacitor has a leak current density of $1.0\ \mu A/cm^2$ or less, tunability of 80% or more and dielectric loss of 0.0050 or less when a voltage of 20 V is applied thereto.

A sixteenth aspect of the present invention is a composite electronic component of a thin film capacitor, capacitor, integrated passive device (IPD), DRAM memory capacitor, multilayer capacitor, transistor gate insulator, non-volatile memory, pyroelectric infrared sensor, piezoelectric element, electro-optical element, actuator, resonator, ultrasonic motor or LC noise filter element having the dielectric thin film based on the fifteenth aspect.

A seventeenth aspect of the present invention is a composite electronic component of a thin film capacitor, capacitor, IPD, DRAM memory capacitor, multilayer capacitor, transistor gate insulator, non-volatile memory, pyroelectric infrared sensor, piezoelectric element, electro-optical element, actuator, resonator, ultrasonic motor or LC noise filter element having a dielectric thin film corresponding to a frequency band of 100 MHz or more based on the sixteenth aspect.

Effects of the Invention

The composition of the first aspect of the present invention is a liquid composition for forming a thin film in the form of a mixed composite metal oxide in which a composite oxide B containing copper (Cu) and a composite oxide C containing manganese (Mn) are mixed into a composite metal oxide A represented with the general formula: $Ba_{1-x}Sr_xTi_yO_3$ (wherein, $0.2<x<0.6$ and $0.9<y<1.1$), wherein the composite metal oxide A, the raw material for composing the composite oxide B and the raw material for composing the composite oxide C are dissolved in an organic solvent at a ratio so as to yield the metal atomic ratio indicated in the aforementioned general formula, and so that the molar ratio B/A of the composite oxide B to the composite metal oxide A is within the range of $0.002<B/A<0.05$, and the molar ratio C/A of the composite oxide C to the composite metal oxide A is within the range of $0.002<C/A<0.03$. As a result, a dielectric thin film can be formed that has extremely low dielectric loss. In addition, leak current density can be lowered and high tunability can be demonstrated in a thin film capacitor provided with a dielectric thin film formed using this composition.

In the composition of the sixth aspect of the present invention, copper naphthenate, copper n-octanoate, copper 2-ethylhexanoate, copper n-heptanoate, copper n-hexanoate, copper 2-ethylbutyrate, copper n-valerate, copper i-valerate, copper n-butyrate, copper i-butyrate or copper propionate is used for the carboxylate compound used as a raw material that composes the composite oxide B. As a result, this composition allows the obtaining of extremely high storage stability.

The method of forming a dielectric thin film of the thirteenth aspect of the present invention is carried out by repeating a step for coating and drying the dielectric thin film-forming composition of the present invention onto a heat-resistant substrate until a film of a desired thickness is obtained, followed by baking the film at a temperature equal to or higher than the crystallization temperature in air, in an oxidizing atmosphere or in a water vapor atmosphere. As a result, a dielectric thin film can be formed that has extremely low dielectric loss. In addition, leak current density can be lowered and high tunability can be demonstrated in a thin film capacitor provided with a dielectric thin film formed using this method.

The dielectric thin film of the fourteenth aspect of the present invention is a dielectric thin film containing Cu and Mn formed according to the aforementioned method of forming a dielectric thin film of the present invention. Consequently, a thin film capacitor can be formed that uses a dielectric thin film having a film thickness within the range of 100 to 500 nm as a dielectric layer, and this thin film capacitor achieves a leak current density of $1.0\ \mu A/cm^2$ or less, tunability of 80% or more and dielectric loss of 0.0050 or less when a voltage of 20 V is applied thereto.

BRIEF DESCRIPTION OF THE DRAWINGS

FIG. 1 is an explanatory drawing showing changes in applied voltage in a variable capacitance element.

DETAILED DESCRIPTION OF THE INVENTION

The following provides an explanation of an embodiment of the present invention based on the drawings.

The dielectric thin film-forming composition of the present invention is a composition for forming a BST dielectric thin film. The dielectric thin film formed using this composition adopts the form of a mixed composite metal oxide in which a composite oxide B containing copper (Cu) and a composite oxide C containing manganese (Mn) are mixed into a composite metal oxide A represented with the general formula: $Ba_{1-x}Sr_xTi_yO_3$ (wherein, $0.2<x<0.6$ and $0.9<y<1.1$). This composition is composed of an organic metal compound solution in which the raw material for composing the composite metal oxide A, the raw material for composing the composite oxide B and the raw material for composing the composite oxide C are dissolved in an organic solvent at a ratio so as to yield the metal atomic ratio indicated in the aforementioned general formula.

Namely, the composition of the present invention is prepared by adding a raw material for composing a composite oxide B containing copper (Cu) and a composite oxide C containing manganese (Mn). As a result, use of the composition of the present invention makes it possible to form a dielectric thin film having extremely low dielectric loss. In addition, leak current density can be lowered and high tunability can be demonstrated in a thin film capacitor and the like provided with a dielectric thin film formed using this composition. The technical reason for being able to lower leak current density is assumed to be the result of densifying the film by adding copper (Cu). In addition, the reason for being able to demonstrate high tunability is assumed to be the result of improving the dielectric constant due to the growth of large crystal grains in the film attributable to the addition of copper (Cu).

Furthermore, although the addition of a raw material containing manganese (Mn) is thought to partially function in lowering leak current density, in the present invention, the addition of a raw material containing manganese (Mn) is not expected to mainly demonstrate the effect of lowering leak current density as in conventional methods. As a result of extensive studies conducted by the inventors of the present invention, novel effects unable to be obtained in the case of respectively containing copper (Cu) and manganese (Mn) separately were confirmed in a dielectric thin film that contained both copper (Cu) and manganese (Mn). Namely, in the present invention, both a composite oxide B containing copper (Cu) and a composite oxide C containing manganese (Mn) are added at a prescribed ratio, and as a result of containing both copper (Cu) and manganese (Mn) in a dielectric thin film, the novel effect of reducing dielectric loss of the dielectric thin film while retaining existing effects was obtained. The technical reason for the reduction in dielectric loss in the case of containing both copper (Cu) and manganese (Mn) in a dielectric thin film is assumed to be the result of more effectively blocking electron conduction paths.

The raw material for the composite metal oxide A is preferably a compound in which an organic group is bonded to each of the metal elements of Ba, Sr and Ti through an oxygen atom or nitrogen atom thereof Examples of such compounds include at least one compound selected from the group consisting of a metal alkoxide, metal-diol complex, metal-triol complex, metal carboxylate, metal-β-diketonate complex, metal-β-diketoester complex, metal-β-iminoketo complex and a metal-amino complex. Particularly preferable compounds include metal alkoxides as well as partial hydrolysates and organic acid salts thereof.

More specifically, examples of Ba compounds include carboxylates such as barium 2-ethylbutyrate, barium 2-ethylhexanoate or barium acetate, and metal alkoxides such as barium diisopropoxide or barium dibutoxide. Examples of Sr compounds include carboxylates such as strontium 2-ethylbutyrate, strontium 2-ethylhexanoate or strontium acetate, and metal alkoxides such as strontium diisopropoxide or strontium dibutoxide. Examples of Ti compounds include metal alkoxides such as titanium tetraethoxide, titanium tetraisopropoxide, titanium tetrabutoxide or titanium dimethoxydiisopropoxide. Although metal alkoxides may be used as is, partial hydroxylates thereof may also be used in order to accelerate decomposition.

In addition, the raw material for the composite oxide B is preferably a compound in which an organic group is bonded to elemental copper (Cu) through an oxygen atom or nitrogen atom thereof. Examples of such compounds include at least one compound selected from the group consisting of carboxylate compounds, nitrate compounds, alkoxide compounds, diol compounds, triol compounds, β-diketonate compounds, β-diketoester compounds, β-iminoketo compounds and amino compounds. Particularly preferable compounds are carboxylate compounds such as copper naphthenate, copper 2-ethylbutyrate, copper n-octanoate, copper 2-ethylhexanoate, copper n-heptanoate, copper n-hexanoate, copper n-valerate, copper i-valerate, copper n-butyrate, copper i-butyrate or copper propionate, or nitrates such as copper nitrate. However, a dielectric thin film-forming composition obtained by using copper acetate as a carboxylate for the raw material thereof is susceptible to precipitation, and is undesirable due to problems with storage stability.

In addition, the raw material for the composite oxide C is preferably a compound in which an organic group is bonded to elemental manganese (Mn) through an oxygen atom or nitrogen atom thereof Examples of such compounds include at least one compound selected from the group consisting of carboxylate compounds, nitrate compounds, alkoxide compounds, diol compounds, triol compounds, β-diketonate compounds, β-diketoester compounds, β-iminoketo compounds and amino compounds. Particularly preferable compounds are carboxylate compounds such as manganese naphthenate, manganese 2-ethylhexanoate or manganese acetate, or nitrate compounds such as manganese nitrate.

In preparing the dielectric thin film-forming composition of the present invention, these raw materials are dissolved in a suitable solvent at a ratio equivalent to the desired dielectric thin film composition, and adjusted to a concentration suitable for coating. In the dielectric thin film after deposition, the molar ratio B/A of the composite oxide B to the composite metal oxide A is adjusted so as to be within the range of $0.002<B/A<0.05$. As a result of adjusting in this manner, low leak current density and high tunability can be demonstrated. Furthermore, if B/A is 0.002 or less, the aforementioned effect of adding the raw material containing copper (Cu) is unable to be adequately obtained, while if B/A is 0.05 or more, tunability decreases. Thus, B/A is preferably within the range of $0.003 \leq B/A \leq 0.03$. In addition, in the dielectric thin film after deposition, the molar ratio C/A of the composite oxide C to the composite metal oxide A is adjusted to be within the range of $0.002<C/A<0.03$. As a result of adjusting in this manner, manganese (Mn) can be contained in addition to copper (Cu) in a deposited dielectric thin film formed using this composition. As a result, a dielectric thin film that dielectric loss thereof is reduced can be formed. Furthermore, if C/A is 0.002 or less, the aforementioned effect of adding the raw material containing manganese (Mn) cannot be adequately obtained, while if C/A is 0.03 or more, leak current density increases. Thus, C/A is preferably within the range of $0.003 \leq C/A \leq 0.02$.

Although the solvent of the dielectric thin film-forming composition used here is suitably determined corresponding to the raw materials used, typically a solvent such as a carboxylic acid, alcohol, ester, ketone (such as acetone or methyl ethyl ketone), ether (such as dimethylether or diethylether), cycloalkane (such as cyclohexane or cyclohexanol), aromatic compound (such as benzene, toluene or xylene) or tetrahydrofuran, or a mixed solvent of two or more types thereof, can be used.

Specific examples of carboxylic acids that are used preferably include n-butyric acid, α-methylbutyric acid, i-valeric acid, 2-ethylbutyric acid, 2,2-dimethylbutyric acid, 3,3-dimethylbutyric acid, 2,3-dimethylbutyric acid, 3-methylpentanoic acid, 4-methylpentanoic acid, 2-ethylpentanoic acid, 3-ethylpentanoic acid, 2,2-dimethylpentanoic acid, 3,3-dimethylpentanoic acid, 2,3-dimethylpentanoic acid, 2-ethylhexanoic acid or 3-ethylhexanoic acid.

In addition, examples of esters that are used preferably include ethyl acetate, propyl acetate, n-butyl acetate, sec-butyl acetate, tert-butyl acetate, isobutyl acetate, n-amyl acetate, sec-amyl acetate, tert-amyl acetate or isoamyl acetate, while examples of alcohols that are used preferably include 1-propanol, 2-propanol, 1-butanol, 2-butanol, isobutyl alcohol, 1-pentanol, 2-pentanol, 2-methyl-2-pentanol or 2-methoxyethanol.

Furthermore, the total concentration of organic metal compounds in the organic metal compound solution of the dielectric thin film-forming composition is preferably about 0.1 to 20% by mass based on the amount of metal compounds.

Stabilizers such as β-diketones (such as acetyl acetone, heptafluorobutanoyl pivaloyl methane, dipivaloyl methane, trifluoroacetyl acetone or benzoyl acetone), β-ketonic acids (such as acetoacetic acid, propionyl acetic acid or benzoyl acetic acid), β-ketoesters (such as methyl, propyl, butyl and other lower alkyl esters of the aforementioned ketonic acids), oxy acids (such as lactic acid, glycolic acid, α-oxybutyric acid or salicylic acid), lower alkyl esters of the aforementioned oxy acids, oxyketones (such as diacetone alcohol or acetoin), diols, triols, higher carboxylic acids, alkanol amines (such as diethanolamine, triethanolamine or monoethanolamine) or polyvalent amines may be added as necessary to the organic metal compound solution at a ratio of the number of stabilizer molecules to the number of metal atoms (the number of stabilizer molecules/the number of metal atoms) of about 0.2 to 3.

In the present invention, the organic metal compound solution prepared in the manner described above is preferably removed of particles by filtration treatment and the like so that the number of particles having a particle diameter of 0.5 μm or more (and particularly particles having a particle diameter of 0.3 μm or more and especially 0.2 μm or more) is 50 particles/mL or less per 1 mL of solution.

Furthermore, a particle counter using a light scattering method is used to measure the number of particles in the organic metal compound solution.

If the number of particles having a particle diameter of 0.5 μm or more in the organic metal compound solution exceeds 50 particles/mL, long-term storage stability becomes inferior. The number of particles having a particle diameter of 0.5 μm or more in the organic metal compound solution is preferably as few as possible, and is particularly preferably 30 particles/mL or less.

Although there are no particular limitations on the method used to treat the organic metal compound solution after preparation so as to achieve the aforementioned number of particles, examples of such methods are described below. A first method consists of a filtration method in which pressure is fed with a syringe using a commercially available membrane filter having a pore diameter of 0.2 μm. A second method consists of a pressure filtration method that combines a commercially available membrane filter having a pore diameter of 0.05 μm with a pressure tank. A third method consists of a recycle filtration method that combines the membrane filter used in the aforementioned second method and a solution recycling tank.

In any of these methods, the particle capture rate of the filter differs according to the solution pressure (the hydraulic pressure). Capture rate is typically known to increase the lower the pressure, and in the first method and second method in particular, it is preferable to pass the solution through the filter extremely slowly at low pressure in order to realize conditions so that the number of particles having a particle diameter of 0.5 μm or less is 50 or less.

By using the dielectric thin film-forming composition of the present invention, a dielectric thin film can be easily formed that adopts the form of a mixed composite metal oxide in which a composite oxide B containing copper (Cu) and a composite oxide C containing manganese (Mn) are mixed into a BST composite metal oxide A. The molar ratio B/A of the composite oxide B to the composite metal oxide A in a thin film formed using this composition is within the range of $0.002<B/A<0.05$. If the molar ratio B/A of the composite oxide B to the composite metal oxide A is within this range, leak current density can be reduced and high tunability can be demonstrated in a thin film capacitor and the like provided with this thin film. If B/A is 0.05 or more, tunability decreases. The molar ratio B/A is preferably 0.003≤B/A≤0.03. In addition, the molar ratio C/A of the composite oxide C to the composite metal oxide A in the thin film is within the range of 0.002<C/A<0.03. If the molar ratio B/A of the composite oxide B to the composite metal oxide A is within the aforementioned range and the molar ratio C/A of the composite oxide C to the composite metal oxide A is within this range, dielectric loss of this dielectric thin film is reduced considerably.

In forming a dielectric thin film using the dielectric thin film-forming composition of the present invention, the aforementioned composition is coated onto a heat-resistant substrate by a coating method such as spin coating, dip coating or liquid source misted chemical deposition (LSMCD), followed by drying (or pre-baking) and main baking.

Specific examples of heat-resistant substrates used include, but are not limited to, substrates using for the uppermost substrate layer, such as single crystal Si, polycrystalline Si, Pt, Pt (uppermost layer)/Ti, Pt (uppermost layer)/Ta, Ru, $RuO_2$, Ru (uppermost layer)/$RuO_2$, $RuO_2$ (uppermost layer)/Ru, Ir, $IrO_2$, Ir (uppermost layer)/$IrO_2$, Pt (uppermost layer)/Ir, Pt (uppermost layer)/$IrO_2$, or a perovskite-type electrically conductive oxide, such as $SrRuO_3$ or $(La_xSr_{(1-x)})CoO_3$.

Furthermore, in cases in which a desired film thickness is unable to be obtained with a single coating, main baking is carried out after repeatedly carrying out coating and drying multiple times. Here, a desired film thickness refers to the thickness of the dielectric thin film obtained after main baking, and in the case of applying to a thin film capacitor having a high capacitance density, the film thickness of the dielectric thin film after main baking is within the range of 50 to 500 nm.

In addition, since pre-baking is carried out to remove solvent while also converting organic metal compounds and organic compounds to composite oxides by pyrolysis or hydrolysis, pre-baking is carried out in air, in an oxidizing atmosphere or in a water vapor-containing atmosphere. Even if heating in air, moisture required for hydrolysis is sufficiently secured from humidity in the air. This heating may be carried out in two steps consisting of low-temperature heating for removing solvent and high-temperature heating for pyrolyzing organic metal compounds and organic compounds.

Main baking is a step for crystallizing the thin film obtained in pre-baking by baking at a temperature equal to or higher than the crystallization temperature, and a dielectric thin film is obtained as a result thereof. The baking atmosphere of this crystallization step preferably consists of $O_2$, $N_2$, Ar, $N_2O$ or $H_2$, or a mixed gas thereof.

Pre-baking is carried out for about 1 to 30 minutes at 150 to 550° C., while main baking is carried out for about 1 to 60 minutes at 450 to 800° C. Main baking may also be carried out by rapid thermal annealing (RTA processing). In the case of carrying out main baking by RTA, the rate of temperature increase is preferably 10 to 100° C./second.

The dielectric thin film of the present invention formed in this manner has extremely low dielectric loss, and leak current density can be reduced and high tunability can be demonstrated in a thin film capacitor and the like provided with this thin film. More specifically, when a thin film capacitor is formed by using for the dielectric layer a dielectric thin film having a film thickness within the range of 100 to 500 nm, and the voltage applied to this thin film capacitor is made to be 20 V, a leak current density of $3.0 \times 10^{-6} A/cm^2$ or less, tunability of 70% or more and dielectric loss of 0.0050 or less are achieved. A value referred to as figure of merit (FOM) obtained by dividing tunability (%) by dielectric loss is widely used as an indicator of thin film capacitor performance. Since the dielectric loss of the dielectric thin film of the present invention is low as previously described, and a thin film capacitor provided with this thin film demonstrates high tunability, the FOM of a thin film capacitor provided with this thin film demonstrates an extremely high value. In addition, the dielectric thin film of the present invention also demonstrates excellent basic characteristics as an IPD.

In this manner, since the dielectric thin film of the present invention has low dielectric loss and improves leak current characteristics and tunability in a thin film capacitor and the like, it can be used as a constituent material of composite electronic components such as a thin film capacitor, capacitor, IPD, DRAM memory capacitor, multilayer capacitor, transistor gate insulator, non-volatile memory, pyroelectric infrared sensor, piezoelectric element, electro-optical element, actuator, resonator, ultrasonic motor or LC noise filter element. In particular, it can be used to accommodate high-frequency bands of 100 MHz or more.

EXAMPLES

The following provides a detailed explanation of examples and comparative examples of the present invention.

Furthermore, the following materials are used as raw materials in the examples and comparative examples described below.

Ba compound: barium 2-ethylbutyrate
Sr compound: strontium 2-ethylbutyrate
Ti compound: titanium tetraisopropoxide
Cu compounds: copper naphthenate, copper 2-ethylbutyrate, copper n-octanoate, copper 2-ethylhexanoate, copper n-valerate, copper i-valerate, copper n-butyrate, copper i-butyrate, copper propionate, copper acetate, copper nitrate
Mn compounds: manganese naphthenate, manganese 2-ethylhexanoate, manganese acetate, manganese nitrate Example 1

Adequately dehydrated isoamyl acetate was used for the organic solvent, and barium 2-ethylbutyrate and strontium 2-ethylbutyrate as Ba compound and Sr compound were dissolved therein at a molar ratio of Sr:Ba of 70:30. Subsequently, titanium tetraisopropoxide as Ti compound was added to the resulting solution at a molar ratio of Ba:Sr:Ti of 70:30:100. In addition, copper 2-ethylhexanoate as Cu compound was added to a molar ratio B/A of the composite oxide B to the composite metal oxide A of 0.003 and dissolved. Moreover, manganese 2-ethylhexanoate as Mn compound was added to a molar ratio C/A of the composite oxide C to the composite metal oxide A of 0.01 and dissolved. In addition, a stabilizer (acetylacetone) for stabilizing the solution was added in an amount equal to one times the molar amount of the total amount of metal to prepare a composition for forming a thin film having a concentration as metal oxide of 7% by mass.

Formation of the thin film was carried out by chemical solution deposition (CSD) as described below.

Namely, a 150-mm (6-inch) silicon substrate was prepared for the substrate in which a Pt lower electrode film was formed on the surface thereof by sputtering. The composition for forming a thin film prepared in the manner described above was coated onto the Pt lower electrode film of this substrate by spin coating under conditions of 3 seconds at 500 rpm followed by 15 seconds at 3000 rpm.

Next, drying and pre-baking were carried out by heating for 5 minutes at 350° C. using a hot plate. After repeating these coating and pre-baking steps three times, a dielectric thin film having a film thickness of 250 nm was obtained by baking for 1 hour at 700° C. in an air atmosphere at a rate of temperature increase of 5° C./minute.

Subsequently, a Pt upper electrode measuring about 250 μm×250 μm square was prepared by sputtering on the surface using a metal mask to obtain a thin film capacitor.

Example 2

As shown in the following Table 1, a composition for forming a thin film was prepared and a thin film capacitor was obtained in the same manner as Example 1 with the exception of using copper 2-ethylbutyrate instead of copper 2-ethylhexanoate for the Cu compound, and adding to a molar ratio B/A of the composite oxide B to the composite metal oxide A of 0.005.

Example 3

As shown in the following Table 1, a composition for forming a thin film was prepared and a thin film capacitor was obtained in the same manner as Example 1 with the exception of adding copper naphthenate instead of copper 2-ethylhexanoate for the Cu compound to a molar ratio B/A of the composite oxide B to the composite metal oxide A of 0.01, adding manganese naphthenate instead of manganese 2-ethylhexanoate for the Mn compound, and adding 1-amino-2-propanol instead of acetylacetone for the stabilizer.

Example 4

As shown in the following Table 1, a composition for forming a thin film was prepared and a thin film capacitor was obtained in the same manner as Example 3 with the exception of adding the copper naphthenate to a molar ratio B/A of the composite oxide B to the composite metal oxide A of 0.02.

Example 5

As shown in the following Table 1, a composition for forming a thin film was prepared and a thin film capacitor was obtained in the same manner as Example 3 with the exception of adding the copper naphthenate to a molar ratio B/A of the composite oxide B to the composite metal oxide A of 0.03.

Example 6

As shown in the following Table 1, a composition for forming a thin film was prepared and a thin film capacitor was obtained in the same manner as Example 3 with the exception of adding the manganese naphthenate to a molar ratio C/A of the composite oxide C to the composite metal oxide A of 0.003.

Example 7

As shown in the following Table 1, a composition for forming a thin film was prepared and a thin film capacitor was obtained in the same manner as Example 3 with the exception of adding the manganese naphthenate to a molar ratio C/A of the composite oxide C to the composite metal oxide A of 0.005.

Example 8

As shown in the following Table 1, a composition for forming a thin film was prepared and a thin film capacitor was obtained in the same manner as Example 1 with the exception of adding copper nitrate instead of copper 2-ethylhexanoate for the Cu compound at a molar ratio B/A of the composite oxide B to the composite metal oxide A of 0.01, and adding manganese nitrate instead of manganese 2-ethylhexanoate for the Mn compound at a molar ratio C/A of the composite oxide C to the composite metal oxide A of 0.02.

Example 9

As shown in the following Table 1, a composition for forming a thin film was prepared and a thin film capacitor was obtained in the same manner as Example 3 with the exception of adding titanium tetraisopropoxide at a molar ratio of Ba:Sr:Ti of 70:30:95.

Example 10

As shown in the following Table 1, a composition for forming a thin film was prepared and a thin film capacitor was obtained in the same manner as Example 3 with the exception of adding titanium tetraisopropoxide at a molar ratio of Ba:Sr:Ti of 70:30:105.

Example 11

As shown in the following Table 1, a composition for forming a thin film was prepared and a thin film capacitor was obtained in the same manner as Example 3 with the exception of adding copper acetate instead of copper naphthenate for the Cu compound and adding acetylacetone instead of 1-amino-2-propanol for the stabilizer.

Example 12

As shown in the following Table 1, a composition for forming a thin film was prepared and a thin film capacitor was obtained in the same manner as Example 3 with the exception of adding copper propionate instead of copper naphthenate for the Cu compound, and adding diethanolamine instead of 1-amino-2-propanol for the stabilizer.

Example 13

As shown in the following Table 2, a composition for forming a thin film was prepared and a thin film capacitor was obtained in the same manner as Example 3 with the exception of adding copper n-butyrate instead of copper naphthenate for the Cu compound, and adding triethanolamine instead of 1-amino-2-propanol for the stabilizer.

Example 14

As shown in the following Table 2, a composition for forming a thin film was prepared and a thin film capacitor was obtained in the same manner as Example 3 with the exception of adding copper i-butyrate instead of copper naphthenate for the Cu compound, adding formamide instead of 1-amino-2-propanol for the stabilizer, and carrying out baking in a dry air atmosphere.

Example 15

As shown in the following Table 2, a composition for forming a thin film was prepared and a thin film capacitor was obtained in the same manner as Example 3 with the exception of adding copper n-valerate instead of copper naphthenate for the Cu compound, adding manganese 2-ethylhexanoate instead of manganese naphthenate for the Mn compound, adding propylene glycol instead of 1-amino-2-propanol for the stabilizer, and carrying out baking in an oxygen atmosphere.

Example 16

As shown in the following Table 2, a composition for forming a thin film was prepared and a thin film capacitor was obtained in the same manner as Example 3 with the exception of adding copper i-valerate instead of copper naphthenate for the Cu compound, adding manganese 2-ethylhexanoate instead of manganese naphthenate for the Mn compound, and adding acetylacetone instead of 1-amino-2-propanol for the stabilizer.

Example 17

As shown in the following Table 2, a composition for forming a thin film was prepared and a thin film capacitor was obtained in the same manner as Example 3 with the exception of adding copper n-hexanoate instead of copper naphthenate for the Cu compound, adding manganese 2-ethylhexanoate instead of manganese naphthenate for the Mn compound, adding acetylacetone instead of 1-amino-2-propanol for the stabilizer, and carrying out baking in a dry air atmosphere.

Example 18

As shown in the following Table 2, a composition for forming a thin film was prepared and a thin film capacitor was obtained in the same manner as Example 3 with the exception of adding copper n-heptanoate instead of copper naphthenate for the Cu compound, adding manganese nitrate instead of manganese naphthenate for the Mn compound, adding acetylacetone instead of 1-amino-2-propanol for the stabilizer, and carrying out baking in an oxygen atmosphere.

Example 19

As shown in the following Table 2, a composition for forming a thin film was prepared and a thin film capacitor was obtained in the same manner as Example 3 with the exception of adding copper n-octanoate instead of copper naphthenate for the Cu compound, adding manganese acetate instead of manganese naphthenate for the Mn compound, and adding acetylacetone instead of 1-amino-2-propanol for the stabilizer.

Example 20

As shown in the following Table 2, a composition for forming a thin film was prepared and a thin film capacitor was obtained in the same manner as Example 3 with the exception of adding the copper naphthenate to a molar ratio B/A of the composite oxide B to the composite metal oxide A of 0.0025 and adding the manganese naphthenate to a molar ratio C/A of the composite oxide C to the composite metal oxide A of 0.0025.

Example 21

As shown in the following Table 2, a composition for forming a thin film was prepared and a thin film capacitor was obtained in the same manner as Example 3 with the exception of adding the copper naphthenate to a molar ratio B/A of the composite oxide B to the composite metal oxide A of 0.04 and adding the manganese naphthenate to a molar ratio C/A of the composite oxide C to the composite metal oxide A of 0.025.

Comparative Example 1

A composition for forming a thin film was prepared and a thin film capacitor was obtained in the same manner as Example 1 with the exception of not adding a Cu compound and Mn compound.

Comparative Example 2

A composition for forming a thin film was prepared and a thin film capacitor was obtained in the same manner as Example 3 with the exception of not adding a Cu compound and adding acetylacetone instead of 1-amino-2-propanol for the stabilizer.

Comparative Example 3

As shown in the following Table 3, a composition for forming a thin film was prepared and a thin film capacitor was obtained in the same manner as Example 1 with the exception of adding the copper 2-ethylhexanoate to a molar ratio B/A of the composite oxide B to the composite metal oxide A of 0.002.

Comparative Example 4

As shown in the following Table 3, a composition for forming a thin film was prepared and a thin film capacitor was obtained in the same manner as Example 3 with the exception of adding the copper naphthenate to a molar ratio B/A of the composite oxide B to the composite metal oxide A of 0.05.

Comparative Example 5

As shown in the following Table 3, a composition for forming a thin film was prepared and a thin film capacitor was obtained in the same manner as Example 1 with the exception of adding copper acetate instead of copper 2-ethylhexanoate for the Cu compound to a molar ratio B/A of the composite oxide B to the composite metal oxide A of 0.001, and not adding an Mn compound.

Comparative Example 6

As shown in the following Table 3, a composition for forming a thin film was prepared and a thin film capacitor was obtained in the same manner as Example 3 with the exception of adding the manganese naphthenate to a molar ratio C/A of the composite oxide C to the composite metal oxide A of 0.002.

Comparative Example 7

As shown in the following Table 3, a composition for forming a thin film was prepared and a thin film capacitor was obtained in the same manner as Example 8 with the exception of adding the manganese nitrate to a molar ratio C/A of the composite oxide C to the composite metal oxide A of 0.03.

Comparative Example 8

As shown in the following Table 3, a composition for forming a thin film was prepared and a thin film capacitor was obtained in the same manner as Example 3 with the exception of adding the titanium tetraisopropoxide to a molar ratio of Ba:Sr:Ti of 70:30:90.

Comparative Example 9

As shown in the following Table 3, a composition for forming a thin film was prepared and a thin film capacitor was obtained in the same manner as Example 3 with the exception of adding the titanium tetraisopropoxide to a molar ratio of Ba:Sr:Ti of 70:30:110.

TABLE 1

| | Composition for Forming Dielectric Thin Film | | | | | Dielectric Thin Film $(Ba_{1-x}Sr_xTi_yO_3)$ | | Deposition Conditions Baking |
|---|---|---|---|---|---|---|---|---|
| | B/A (molar ratio) | C/A (molar ratio) | Added Form of Raw Material B | Added Form of Raw Material C | Stabilizer | x | y | Atmosphere |
| Example 1 | 0.003 | 0.01 | Cu 2-ethylhexanoate | Mn 2-ethylhexanoate | Acetylacetone | 0.3 | 1 | Air |
| Example 2 | 0.005 | 0.01 | Cu 2-ethylbutyrate | Mn 2-ethylhexanoate | Acetylacetone | 0.3 | 1 | Air |
| Example 3 | 0.01 | 0.01 | Cu naphthenate | Mn naphthenate | 1-amino-2-propanol | 0.3 | 1 | Air |
| Example 4 | 0.02 | 0.01 | Cu naphthenate | Mn naphthenate | 1-amino-2-propanol | 0.3 | 1 | Air |
| Example 5 | 0.03 | 0.01 | Cu naphthenate | Mn naphthenate | 1-amino-2-propanol | 0.3 | 1 | Air |
| Example 6 | 0.01 | 0.003 | Cu naphthenate | Mn naphthenate | 1-amino-2-propanol | 0.3 | 1 | Air |
| Example 7 | 0.01 | 0.005 | Cu naphthenate | Mn naphthenate | 1-amino-2-propanol | 0.3 | 1 | Air |
| Example 8 | 0.01 | 0.02 | Cu nitrate | Mn nitrate | Acetylacetone | 0.3 | 1 | Air |
| Example 9 | 0.01 | 0.01 | Cu naphthenate | Mn naphthenate | 1-amino-2-propanol | 0.3 | 0.95 | Air |
| Example 10 | 0.01 | 0.01 | Cu naphthenate | Mn naphthenate | 1-amino-2-propanol | 0.3 | 1.05 | Air |
| Example 11 | 0.01 | 0.01 | Cu acetate | Mn naphthenate | Acetylacetone | 0.3 | 1 | Air |
| Example 12 | 0.01 | 0.01 | Cu propionate | Mn naphthenate | Diethanolamine | 0.3 | 1 | Air |

TABLE 2

| | Composition for Forming Dielectric Thin Film | | | | | Dielectric Thin Film $(Ba_{1-x}Sr_xTi_yO_3)$ | | Deposition Conditions Baking |
|---|---|---|---|---|---|---|---|---|
| | B/A (molar ratio) | C/A (molar ratio) | Added Form of Raw Material B | Added Form of Raw Material C | Stabilizer | x | y | Atmosphere |
| Example 13 | 0.01 | 0.01 | Cu n-butyrate | Mn naphthenate | Triethanolamine | 0.3 | 1 | Air |
| Example 14 | 0.01 | 0.01 | Cu i-butyrate | Mn naphthenate | Formamide | 0.3 | 1 | Dry air |
| Example 15 | 0.01 | 0.01 | Cu n-valerate | Mn 2-ethylhexanoate | Propylene glycol | 0.3 | 1 | Oxygen |
| Example 16 | 0.01 | 0.01 | Cu i-valerate | Mn 2-ethylhexanoate | Acetylacetone | 0.3 | 1 | Air |
| Example 17 | 0.01 | 0.01 | Cu n-hexanoate | Mn 2-ethylhexanoate | Acetylacetone | 0.3 | 1 | Dry air |
| Example 18 | 0.01 | 0.01 | Cu n-heptanoate | Mn nitrate | Acetylacetone | 0.3 | 1 | Oxygen |
| Example 19 | 0.01 | 0.01 | Cu n-octanoate | Mn nitrate | Acetylacetone | 0.3 | 1 | Air |
| Example 20 | 0.0025 | 0.0025 | Cu naphthenate | Mn naphthenate | 1-amino-2-propanol | 0.3 | 1 | Air |
| Example 21 | 0.04 | 0.025 | Cu naphthenate | Mn naphthenate | 1-amino-2-propanol | 0.3 | 1 | Air |

TABLE 3

| | Composition for Forming Dielectric Thin Film | | | | | Dielectric Thin Film $(Ba_{1-x}Sr_xTi_yO_3)$ | | Deposition Conditions Baking |
|---|---|---|---|---|---|---|---|---|
| | B/A (molar ratio) | C/A (molar ratio) | Added Form of Raw Material B | Added Form of Raw Material C | Stabilizer | x | y | Atmosphere |
| Comp. Ex. 1 | 0 | 0 | — | — | Acetylacetone | 0.3 | 1 | Air |
| Comp. Ex. 2 | 0 | 0.01 | — | Mn naphthenate | Acetylacetone | 0.3 | 1 | Air |
| Comp. Ex. 3 | 0.002 | 0.01 | Cu 2-ethylhexanoate | Mn 2-ethylhexanoate | Acetylacetone | 0.3 | 1 | Air |
| Comp. Ex. 4 | 0.05 | 0.01 | Cu naphthenate | Mn naphthenate | 1-amino-2-propanol | 0.3 | 1 | Air |
| Comp. Ex. 5 | 0.001 | 0 | Cu acetate | — | Acetylacetone | 0.3 | 1 | Air |
| Comp. Ex. 6 | 0.01 | 0.002 | Cu naphthenate | Mn naphthenate | 1-amino-2-propanol | 0.3 | 1 | Air |
| Comp. Ex. 7 | 0.01 | 0.03 | Cu nitrate | Mn nitrate | Acetylacetone | 0.3 | 1 | Air |
| Comp. Ex. 8 | 0.01 | 0.01 | Cu naphthenate | Mn naphthenate | 1-amino-2-propanol | 0.3 | 0.9 | Air |
| Comp. Ex. 9 | 0.01 | 0.01 | Cu naphthenate | Mn naphthenate | 1-amino-2-propanol | 0.3 | 1.1 | Air |

<Comparative Testing and Evaluation>

The thin film capacitors obtained in Examples 1 to 21 and Comparative Examples 1 to 9 were evaluated for leak current density, tunability, dielectric loss and figure of merit (FOM). These results are shown in Tables 4 and 5.

(1) Leak Current Density: The voltage dependency (I-V characteristics) of leak current density was evaluated by applying a direct current voltage between the upper electrode and the Pt lower electrode directly beneath the dielectric thin film of the thin film capacitor, and the leak current density value at an applied voltage of 20 V was used as a typical value. Furthermore, I-V characteristics were measured using a current-voltage measurement device (Keithley Instruments, Model No. 236SMU) under conditions of a bias step of 0.5 V, delay time of 0.1 sec., temperature of 23° C. and hygrometry of 50±10%.

(2) Tunability: A bias voltage of 20 V was applied at 10 MHz between the Pt upper electrode and the Pt lower electrode of the thin film capacitor, and the variation T (%) in electrostatic capacitance calculated according to the following formula (1) was calculated from the electrostatic capacitance $C_{0V}$ when the bias voltage was not applied and the electrostatic capacitance $C_{20V}$ when a bias voltage of 20 V was applied. Furthermore, the variation T (%) in electrostatic capacitance was measured using an impedance material analyzer (Hewlett-Packard, Model No. HP4291A).

$$T = (C_{0V} - C_{20V})/C_{0V} \times 100 \qquad (1)$$

(3) Dielectric Loss (tan δ): Dielectric loss was evaluated when a bias voltage of 20 V was applied at 10 MHz between the Pt upper electrode and the Pt lower electrode of the thin film capacitor. Furthermore, dielectric loss was measured using an impedance material analyzer (Hewlett-Packard, Model No. HP4291A).

(4) FOM: The value of FOM was calculated according to the following formula (2) from the values of the variation T (%) in electrostatic capacitance calculated according to the aforementioned formula (1) and the previously measured dielectric loss.

$$FOM = T/(\tan \delta 100) \qquad (2)$$

(5) Storage Stability: Each prepared dielectric thin film-forming composition was filtered using a membrane filter (Nihon Entegris, pore diameter: 0.05 μm) and a pressure tank under the hydraulic pressure of 0.05 MPa, and the composition was transferred to a washed glass screw-top bottle (Wakayama CIC Research Laboratory Washed Product) and stored for 2 months while holding at a temperature of 7° C. The number of particles (number of particles/ml) having a particle diameter of 0.5 μm or more in the liquid was respectively confirmed with a particle counter (Rion, KS-42B) for the compositions immediately after filtering (after allowing to stand undisturbed for 2 hours) and the compositions after storing for 2 months. Furthermore, compositions were evaluated in Tables 4 and 5 as "OK" if the number of particles in the liquid contained in the compositions after storage was less than 50 particles/ml, and "NG" if the number of particles exceeded 50 particles/ml.

TABLE 4

| | Thin Film Capacitor | | | | Composition for Forming Dielectric Thin Film | | |
| | | | | | Particle count (number of particles/ml) | | |
| | Leak current density (μA/cm²) | Tunability (%) | Dielectric loss | FOM | Immediately after | After storage | Storage stability |
|---|---|---|---|---|---|---|---|
| Example 1  | 0.42 | 81.6 | 0.0049 | 166.5 | 13 | 15  | OK |
| Example 2  | 0.39 | 82.2 | 0.0045 | 182.7 | 14 | 17  | OK |
| Example 3  | 0.34 | 83.9 | 0.0043 | 195.1 | 18 | 18  | OK |
| Example 4  | 0.33 | 83   | 0.0043 | 193   | 16 | 18  | OK |
| Example 5  | 0.38 | 81.5 | 0.0047 | 173.4 | 14 | 20  | OK |
| Example 6  | 0.52 | 81.8 | 0.0048 | 170.4 | 15 | 18  | OK |
| Example 7  | 0.41 | 82.9 | 0.0042 | 197.4 | 17 | 19  | OK |
| Example 8  | 0.52 | 81.2 | 0.005  | 162.4 | 25 | 40  | OK |
| Example 9  | 0.33 | 82.7 | 0.0042 | 196.6 | 19 | 20  | OK |
| Example 10 | 0.44 | 82   | 0.0049 | 167.3 | 21 | 26  | OK |
| Example 11 | 0.39 | 83.8 | 0.0045 | 186.2 | 35 | 280 | NG |
| Example 12 | 0.4  | 83.5 | 0.0045 | 185.6 | 28 | 43  | OK |
| Example 13 | 0.34 | 83   | 0.0043 | 193   | 24 | 38  | OK |
| Example 14 | 0.35 | 83.5 | 0.0044 | 189.8 | 23 | 30  | OK |
| Example 15 | 0.33 | 82.9 | 0.0044 | 188.4 | 18 | 22  | OK |
| Example 16 | 0.33 | 83.4 | 0.0043 | 194   | 16 | 19  | OK |
| Example 17 | 0.38 | 83.6 | 0.0044 | 190   | 14 | 19  | OK |
| Example 18 | 0.37 | 83.6 | 0.0043 | 194.4 | 26 | 38  | OK |
| Example 19 | 0.36 | 84   | 0.0043 | 195.3 | 32 | 47  | OK |
| Example 20 | 0.65 | 80.5 | 0.0049 | 164.3 | 16 | 17  | OK |
| Example 21 | 0.78 | 80.1 | 0.005  | 160.2 | 16 | 20  | OK |

TABLE 5

| | Thin Film Capacitor | | | | Composition for Forming Dielectric Thin Film | | |
| | | | | | Particle count (number of particles/ml) | | |
| | Leak current density (μA/cm²) | Tunability (%) | Dielectric loss | FOM | Immediately after | After storage | Storage stability |
|---|---|---|---|---|---|---|---|
| Comp. Ex. 1 | 111.2 | 77   | 0.0077 | 100   | 14 | 18  | OK |
| Comp. Ex. 2 | 0.42  | 80.7 | 0.0062 | 130.2 | 17 | 18  | OK |
| Comp. Ex. 3 | 0.41  | 80.9 | 0.0061 | 132.6 | 15 | 17  | OK |
| Comp. Ex. 4 | 0.42  | 78.2 | 0.0057 | 137.2 | 18 | 24  | OK |
| Comp. Ex. 5 | 6.29  | 78.4 | 0.006  | 130.7 | 23 | 102 | NG |
| Comp. Ex. 6 | 1.33  | 81.4 | 0.0054 | 150.7 | 16 | 17  | OK |
| Comp. Ex. 7 | 6.14  | 73.6 | 0.0052 | 141.5 | 29 | 43  | OK |
| Comp. Ex. 8 | 0.48  | 72.8 | 0.0052 | 140   | 18 | 22  | OK |
| Comp. Ex. 9 | 0.5   | 68.2 | 0.006  | 113.7 | 21 | 28  | OK |

As is clear from Tables 1 to 5, a comparison of Examples 1 to 21 and Comparative Examples 1 to 9 indicated that, in Comparative Example 1 in particular in which neither copper nor manganese was added, poor results were obtained for all evaluation parameters with the exception of the evaluation of storage stability of the composition. On the other hand, in Examples 1 to 21, sufficiently excellent results were obtained for each of the parameters of leak current density, tunability, dielectric loss and FOM.

In addition, in a comparison of Examples 1 to 21, Comparative Examples 2 and 3 and Comparative Examples 5 and 6, in Comparative Example 2, in which only manganese was added without adding copper, and in Comparative Example 3, in which the ratio of B/A was 0.002 or less, namely the amount of copper added was less than the lower limit value, although extremely low values were obtained for leak current density, extremely high values were demonstrated for dielectric loss, while low values were demonstrated for FOM. On the basis of these findings, the addition of manganese only was determined to prevent the obtaining of effects that reduce dielectric loss. Similarly, in Comparative Example 5, in which only copper was added without adding manganese, and in Comparative Example 6, in which the ratio of C/A was 0.002 or less, namely the amount of manganese added was less than the lower limit value, high values were demonstrated for dielectric loss while low values were demonstrated for FOM. On the basis of these findings, the addition of copper alone was also determined to prevent the obtaining of effects that reduce dielectric loss. On the other hand, in Examples 1 to 21, in which both copper and manganese were added, effects that reduce dielectric loss were determined to be adequately obtained.

In addition, in a comparison of Examples 1 to 21 and Comparative Examples 4 and 7, in Comparative Example 4, in which the ratio of B/A was 0.05 or more, namely the amount of copper added exceeded the upper limit value, tunability was lower than that of Examples 1 to 21 and FOM also demonstrated low values due to inhibition of the growth of crystal grains. In addition, in Comparative Example 7, in which the ratio of C/A was 0.03 or more, namely the amount of manganese added exceeded the upper limit value, leak current density demonstrated high values than Examples 1 to 21 and tunability was determined to be extremely low due to the formation of crystal defects.

In addition, in a comparison of Examples 1 to 21 and Comparative Examples 8 and 9, in Comparative Example 8, in which the value of y was 0.9 or less, namely the value of y was below the lower limit value, tunability was extremely low in comparison with Examples 1 to 21 due to a large difference in the stoichiometric ratio. In addition, in Comparative Example 9, in which the value of y was 1.1 or more, namely the value of y exceeded the upper limit value, tunability was again extremely low in comparison with Examples 1 to 21 due to a large difference in the stoichiometric ratio.

In addition, in the compositions for forming a dielectric thin film of Example 11 and Comparative Example 5, which were prepared using copper acetate for the raw material of the composite oxide B, a considerable increase in the number of particles in the liquid was confirmed after storing for 2 months, thus indicating poor storage stability. In contrast, in those compositions for forming a dielectric thin film that were prepared using a raw material other than copper acetate for the raw material of the composite oxide B, there were few particles in the liquid after storing for 2 months, thus confirming these compositions to have excellent storage stability.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A dielectric thin film-forming composition for forming a BST dielectric thin film, comprising:
    a liquid composition for forming a thin film in the form of a mixed composite metal oxide in which a composite oxide B containing copper (Cu) and a composite oxide C containing manganese (Mn) are mixed into a composite metal oxide A represented with the general formula: $Ba_{1-x}Sr_xTi_yO_3$ (wherein, $0.2<x<0.6$ and $0.9<y<1.1$); wherein,
    the liquid composition is composed of an organic metal compound solution in which the raw material for composing the composite metal oxide A, the raw material for composing the composite oxide B and the raw material for composing the composite oxide C are dissolved in an organic solvent at a ratio so as to yield the metal atomic ratio indicated in the aforementioned general formula, and so that the molar ratio B/A of the composite oxide B to the composite metal oxide A is within the range of $0.002<B/A<0.05$, and the molar ratio C/A of the composite oxide C to the composite metal oxide A is within the range of $0.002<C/A<0.03$.

2. The dielectric thin film-forming composition according to claim 1, wherein the raw material for composing the composite metal oxide A is a compound in which an organic group is bonded to a metal element through an oxygen atom or nitrogen atom thereof.

3. The dielectric thin film-forming composition according to claim 2, wherein the raw material for composing the composite metal oxide A is at least one compound selected from the group consisting of a metal alkoxide, metal-diol complex, metal-triol complex, metal carboxylate, metal-β-diketonate complex, metal-β-diketoester complex, metal-β-iminoketo complex and a metal-amino complex.

4. The dielectric thin film-forming composition according to claim 1, wherein the raw material for composing the composite oxide B is a compound in which an organic group is bonded to elemental copper (Cu) through an oxygen atom or nitrogen atom thereof.

5. The dielectric thin film-forming composition according to claim 4, wherein the raw material for composing the composite oxide B is at least one compound selected from the group consisting of a carboxylate compound, nitrate compound, alkoxide compound, diol compound, triol compound, β-diketonate compound, β-diketoester compound, β-iminoketo compound and amino compound.

6. The dielectric thin film-forming composition according to claim 5, wherein the carboxylate compound is copper naphthenate, copper n-octanoate, copper 2-ethylhexanoate, copper n-heptanoate, copper n-hexanoate, copper 2-ethylbutyrate, copper n-valerate, copper i-valerate, copper n-butyrate, copper i-butyrate or copper propionate.

7. The dielectric thin film-forming composition according to claim 5, wherein the nitrate compound is copper nitrate.

8. The dielectric thin film-forming composition according to claim 1, wherein the raw material for composing the composite oxide C is a compound in which an organic group is bonded to elemental manganese (Mn) through an oxygen atom or nitrogen atom thereof.

9. The dielectric thin film-forming composition according to claim 8, wherein the raw material for composing the composite oxide C is at least one compound selected from the group consisting of a carboxylate compound, nitrate compound, alkoxide compound, diol compound, triol compound, β-diketonate compound, β-diketoester compound, β-iminoketo compound and amino compound.

10. The dielectric thin film-forming composition according to claim 1, further containing at least one stabilizers, selected from the group consisting of a β-diketone, β-ketonic acid, β-ketoester, oxy acid, diol, triol, higher carboxylic acid, alkanolamine and polyvalent amine, at a ratio of 0.2 to 3 moles to 1 mole of the total amount of metal in the composition.

11. The dielectric thin film-forming composition according to claim 1, wherein the molar ratio B/A of the composite oxide B to the composite metal oxide A is $0.003 \leq B/A \leq 0.03$.

12. The dielectric thin film-forming composition according to claim 1, wherein the molar ratio C/A of the composite oxide C to the composite metal oxide A is $0.003 \leq C/A \leq 0.02$.

13. A method of forming a dielectric thin film, comprising the steps of:
repeating a step for coating and drying the dielectric thin film-forming composition according to claim 1 on a heat-resistant substrate until a film of a desired thickness is obtained, followed by baking the film at a temperature equal to or higher than the crystallization temperature in air, in an oxidizing atmosphere or in a water vapor-containing atmosphere.

14. A BST dielectric thin film containing Cu and Mn formed according to the method according to claim 13.

15. The BST dielectric thin film containing Cu and Mn according to claim 14, wherein a thin film capacitor is formed having a dielectric thin film having a film thickness within the range of 100 to 500 nm as a dielectric layer, and the thin film capacitor has a leak current density of 1.0 $\mu$A/cm$^2$ or less, tunability of 80% or more and dielectric loss of 0.0050 or less when a voltage of 20 V is applied thereto.

16. A composite electronic component of a thin film capacitor, capacitor, IPD, DRAM memory capacitor, multi-layer capacitor, transistor gate insulator, non-volatile memory, pyroelectric infrared sensor, piezoelectric element, electro-optical element, actuator, resonator, ultrasonic motor or LC noise filter element having the dielectric thin film according to claim 15.

17. A composite electronic component of a thin film capacitor, capacitor, IPD, DRAM memory capacitor, multi-layer capacitor, transistor gate insulator, non-volatile memory, pyroelectric infrared sensor, piezoelectric element, electro-optical element, actuator, resonator, ultrasonic motor or LC noise filter element having a dielectric thin film corresponding to a frequency band of 100 MHz or more according to claim 16.

18. The dielectric thin film-forming composition according to claim 1, wherein a thin film capacitor, which has the BST dielectric thin film formed by the dielectric thin film-forming composition, has a leak current density of $3.0 \times 10^{-6}$ A/cm$^2$ or less, a tunability of 70% or more and a dielectric loss of 0.0050 or less, with a voltage of 20 V.

19. The dielectric thin film-forming composition according to claim 1, wherein a thin film capacitor, which has the BST dielectric thin film formed by the dielectric thin film-forming composition, has a figure of merit of 160.2 or more.

* * * * *